(12) United States Patent
Vainio et al.

(10) Patent No.: US 6,792,053 B1
(45) Date of Patent: Sep. 14, 2004

(54) METHOD FOR ESTIMATING CHANNEL BIT ERROR RATIO, AND RECEIVER

(75) Inventors: Janne Vainio, Lempäälä (FI); Hannu Mikkola, Tampere (FI); Arto Saikanmäki, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/423,391

(22) PCT Filed: Mar. 16, 1999

(86) PCT No.: PCT/FI99/00194

§ 371 (c)(1),
(2), (4) Date: Nov. 8, 1999

(87) PCT Pub. No.: WO99/48237

PCT Pub. Date: Sep. 23, 1999

(30) Foreign Application Priority Data

Mar. 16, 1998 (FI) .................................................. 980580

(51) Int. Cl.[7] .............................................. H03D 1/00
(52) U.S. Cl. ...................................... 375/341; 375/225
(58) Field of Search ................................. 375/225, 341

(56) References Cited

U.S. PATENT DOCUMENTS

| | | | | |
|---|---|---|---|---|
| 5,113,400 A | * | 5/1992 | Gould et al. ................. | 714/795 |
| 5,408,502 A | * | 4/1995 | How .......................... | 375/340 |
| 5,557,639 A | | 9/1996 | Heikkila et al. | |
| 5,666,370 A | * | 9/1997 | Ganesan et al. ............. | 714/752 |
| 5,671,255 A | * | 9/1997 | Wang et al. ................. | 375/341 |
| 6,061,823 A | * | 5/2000 | Nara .......................... | 714/758 |
| 6,092,230 A | * | 7/2000 | Wood et al. ................. | 714/755 |

FOREIGN PATENT DOCUMENTS

| | | |
|---|---|---|
| EP | 0 643 493 A1 | 3/1995 |
| JP | 63181540 | 7/1988 |
| WO | 96/26583 | 8/1996 |

OTHER PUBLICATIONS

Proakis, John G.: Digital Communications, Third Edition, ISBN 0–07–051726–6, chapter 8: Block and convolutional channel codes.

* cited by examiner

*Primary Examiner*—Temesghen Ghebretinsae
*Assistant Examiner*—Pankaj Kumar
(74) *Attorney, Agent, or Firm*—Pillsbury Winthrop LLP (57) ABSTRACT

The invention relates to a method for estimating a channel bit error ratio in a receiver, and to a receiver. In the method, a pseudo bit error ratio of a channel is determined. The receiver (114) comprises detecting means (202, 204, 206, 208) for detecting a data sequence of a received signal; decoding means (302) for decoding a first encoding of the detected data signal; and re-encoding meant (310) for re-encoding with the first encoding the data sequence decoded from the first encoding. The receiver (114) of the invention further comprises quality determining means (304) for providing the detected data sequence with a value for quality, and estimating means (308) for estimating the bit error ratio-provided that the quality of the detected data sequence fulfils a predetermined quality requirement by comparing the detected data sequence with the data sequence re-encoded with first encoding. The first encoding is typically a convolution coding. One way in which quality can be determined is to decode the second encoding which is, for example, a cyclic redundancy check.

26 Claims, 7 Drawing Sheets

METHOD FOR ESTIMATING CHANNEL BIT ERROR RATIO, AND RECEIVER

FIELD OF THE INVENTION

The invention relates to a method for estimating channel bit error ratio in a receiver, the method comprising: detecting a data sequence of a received signal; decoding a first encoding of the detected data sequence; re-encoding the data sequence decoded from the first encoding by applying the first encoding.

BACKGROUND OF THE INVENTION

Communication systems, such as cellular radio networks, need information about the quality of the transmission channel for system tuning. A receiver typically informs the quality of the channel it receives to a transmitter. In the GSM system, for example, one method of measuring channel quality is to determine its bit error ratio. The real bit error ratio (bit error rate) of a channel cannot be measured without knowing exactly what was sent.

A prior art method to estimate channel bit error ratio is to use a re-encoding technique, whereby a decoded data sequence is re-encoded. The re-encoded data sequence is compared with the detected data sequence to allow the bit error ratio of the channel concerned to be estimated. The comparison is carried out by measuring how much the re-encoded sequence differs from the received detected sequence. The estimate of the channel bit error ratio thus obtained is referred to as a pseudo bit error ratio.

If the decoder has been able to correct all the errors that have appeared into the bit in the channel, the bit error ratio estimate provides an accurate value for the real bit error ratio. Any errors left after the decoding diminish the accuracy the bit error ratio estimate. The more the sequence decoded from the channel encoding contains errors, the less useful the calculated estimate will be. This leads to situations where the pseudo bit error ratio can erroneously indicate a bad channel to be a good one. The estimating of the bit error ratio is based on the assumption that the decoded data does not contain errors, or at least there are very few of them.

A widely used coding method is convolution coding, in which the data to be transmitted is coded into code words. In the channel there are sources of interference distorting the code words. In the receiver the received information no longer corresponds to any accepted code word. It is therefore possible that an incorrectly received, distorted code word can be interpreted as another code word than the one that was sent. As the incorrect code word is then re-encoded and compared with the distorted code word received, the pseudo bit error ratio provided is a number representing a channel of good quality. The estimation is, however, incorrect because the right object of comparison would have been the code word that was actually sent. If the code word that was actually sent were known, it could be compared with the distorted code word received, and the pseudo bit error ratio obtained as a result would be a number representing a channel of a poor quality, which would be correspond to reality.

FI 934480 and U.S. Pat. No. 5,113,400 disclose decoders using the re-encoding method. In FI 934480 the estimating of the pseudo bit error ratio and the estimated signal-to-noise ratio are combined into one equation. The value provided by the equation is compared with a predetermined threshold value, whereby it is possible to conclude whether the quality of the GSM speech frame concerned is poor. The disclosed method cannot not, however, be used for enhancing the accuracy of the estimating of the pseudo bit error ratio. U.S. Pat. No. 5,113,400 discloses a error detection method applying the above described re-encoding method. The re-encoding method described in the publication incorporates the shortcomings already described, and it does not offer solution to the problem concerned, i.e. how to obtain a reliable pseudo bit error ratio also in situations where the decoded data sequence received contains errors.

BRIEF DESCRIPTION OF THE INVENTION

An object of the invention is thus to provide a method and an equipment implementing the method which allow the above problems to the solved. This is achieved with a method described in the preamble, characterized by determining a value for the quality of the detected data sequence and, if the quality of the detected data sequence fulfils a predetermined quality requirement, by estimating a bit error ratio by comparing the detected data sequence with the data sequence re-encoded by applying the first encoding.

The invention further relates to a receiver comprising: detecting means for detecting a data sequence of a received signal; decoding means for decoding a first encoding of the detected data sequence; re-encoding means for re-encoding with the first encoding the data sequence decoded from the first encoding.

The receiver of the invention is characterized in that the receiver further comprises: quality determining means for providing a value for the quality of the detected data sequence; estimating means for estimating a bit error ratio, if the quality of the detected data sequence fulfils a predetermined quality requirement, by comparing the detected data sequence with the data sequence re-encoded with the first encoding.

Preferred embodiments of the invention are disclosed in the dependent claims.

The invention is based on the idea of not estimating bit error ratio for a data sequence if by means of another method it has been shown that the data sequence does not fulfil a predetermined quality requirement.

An advantage the method and system of the invention provide is that on a longer term they improve the accuracy of pseudo bit error ratio in situations where the decoding of the first encoding cannot remove all errors.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Figure 1:
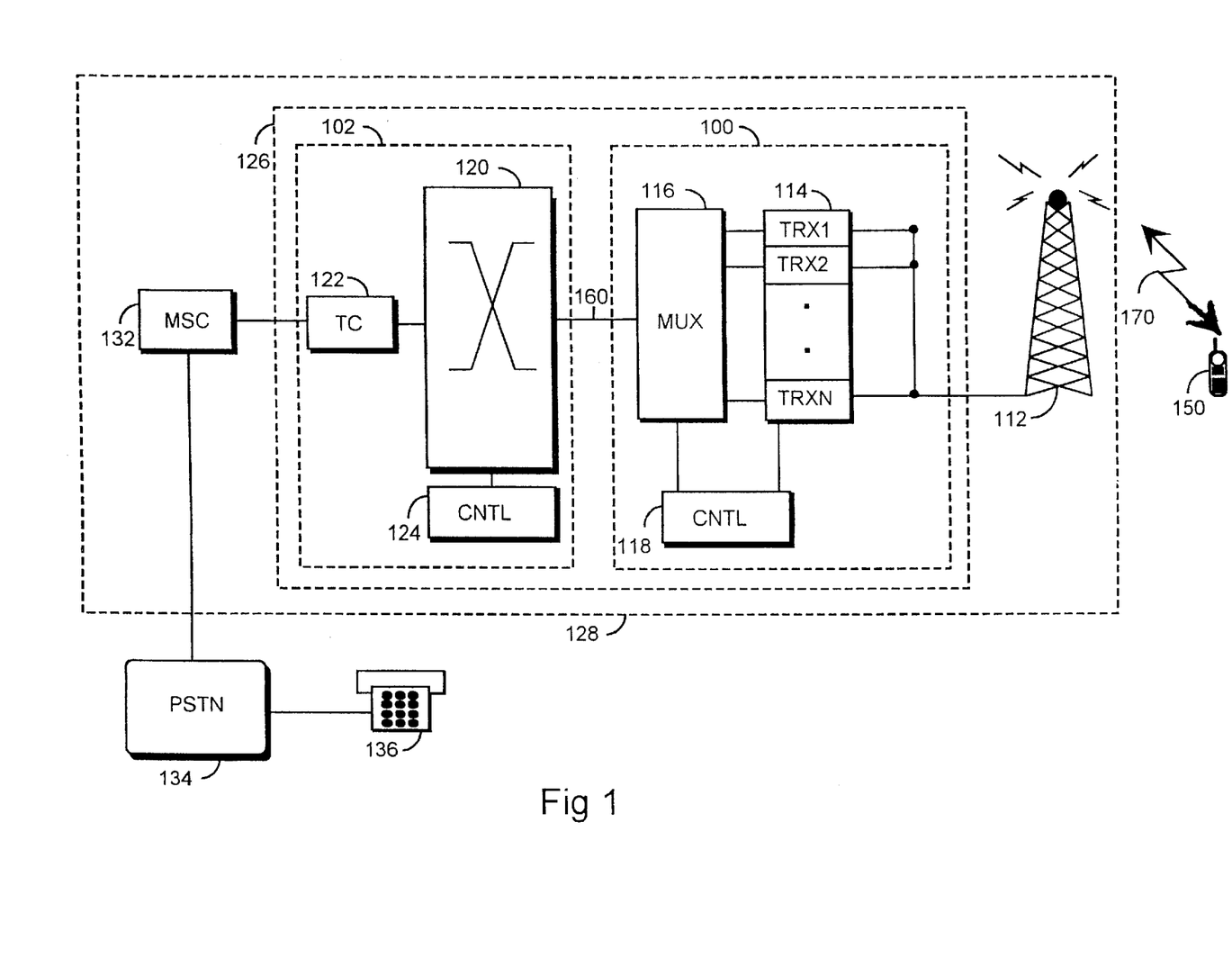
FIG. 1 illustrates an example of a cellular radio network in which the invention is applied.

The invention can be used in various kinds of receivers. In the examples described the invention is used in a cellular radio network. With reference to FIG. 1, a typical structure of a cellular radio network will be described. FIG. 1 only comprises the blocks that are essential for the description of the invention, although it is apparent to a person skilled in the art that a conventional cellular radio network also comprises other functions and structures which need not be discussed in greater detail in this context. The examples illustrate a cellular radio network utilizing TDMA (Time Division Multiple Access), without, however, restricting the invention thereto.

A cellular radio network typically comprises a fixed network infrastructure, i.e. a network part 128, and subscriber terminals 150, which may be fixedly mounted, vehicle mounted or portable terminals. The network part 128 comprises base stations 100. A plural number of base stations 100 are, in turn, controlled in a centralized manner by a base station controller 102 communicating with them. A base station 100 comprises transceivers 114. A base station 100 typically comprises 1 to 16 transceivers 114. In TDMA radio systems, for example, a transceiver 114 offers radio capacity to one TDMA frame, i.e. typically to eight time slots.

The base station 100 comprises a control unit 118 which controls the operation of the transceivers 114 and a multiplexer 116. The multiplexer 116 arranges the traffic and control channels used by a plural number of transceivers 114 to a single transmission connection 160.

The transceivers 114 of the base station 100 are connected to an antenna unit 112 which provides a bi-directional radio connection 170 to a subscriber terminal 150. The structure of the frames transmitted in the bi-directional radio connection 170 is determined in detail, and the connection is referred to as an air interface.

Figure 2:
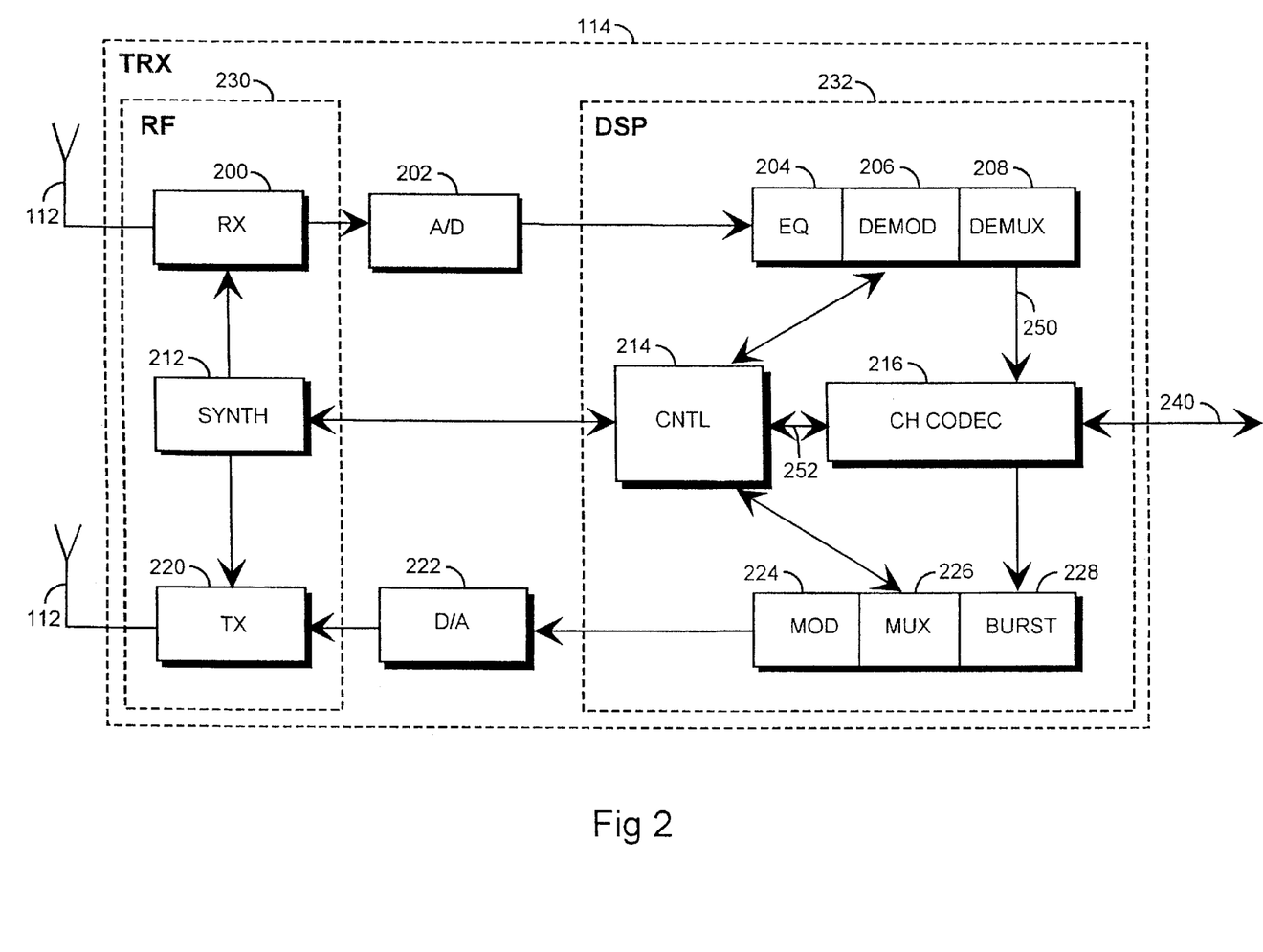
FIG. 2 illustrates an example of a transceiver.

FIG. 2 illustrates in greater detail the structure of a transceiver 114. A receiver 200 comprises a filter blocking frequencies outside a desired frequency band. A signal is then converted to an intermediate frequency or directly to baseband, and in this form the signal is sampled and quantized in an analog-to-digital converter 202. An equalizer 204 compensates for interference caused for instance by multi-path propagation. From the equalized signal, a demodulator 206 takes a bit stream, which is transmitted to a demultiplexer 208. The demultiplexer 208 separates the bit stream from different time slots into separate logical channels. A channel codec 216 decodes the bit stream of the separate logical channels, i.e. decides whether the bit stream is signalling data, which is transmitted to a control unit 214, or whether the bit stream is speech, which is transmitted 240 to a speech codec 122 of the base station controller 102. The channel codec 216 also performs error correction. The control unit 214 performs internal control functions by controlling different units. A burst former 228 adds a training sequence and a tail to the data arriving from the speech codec 216. A multiplexer 226 assigns a time slot to each burst. A modulator 224 modulates digital signals to a radio frequency carrier. This is an analog operation, therefore a digital-to-analog converter 222 is needed for performing it. A transmitter 220 comprises a filter restricting the bandwidth. In addition, the transmitter 220 controls the output power of a transmission. A synthesizer 212 arranges the necessary frequencies for the different units. The synthesizer 212 comprises a clock that can be controlled locally or in a centralized manner from elsewhere, from the base station controller 102, for example. The synthesizer 212 creates the necessary frequencies by means of a voltage controlled oscillator, for example.

As shown in FIG. 2, the structure of the transceiver can be further divided into radio frequency parts 230 and a digital signal processor including software 232. The radio frequency parts 230 comprise the receiver 200, transmitter 220 and synthesizer 212. The digital signal processor including software 232 comprises an equalizer 204, demodulator 206, demultiplexer 208, channel codec 216, control unit 214, burst former 228, multiplexer 226 and modulator 224. The analog-to-digital converter 202 is needed for converting an analog radio signal to a digital signal and, correspondingly, the digital-to-analog converter 222 is needed for converting a digital signal to an analog signal.

The base station controller 102 comprises a group switching field 120 and a control unit 124. The group switching field 120 is used for switching speech and data and for connecting signalling circuits. The base station 100 and the base station controller 102 form a Base Station System 126 which additionally comprises a transcoder 122. The transcoder 122 is usually located as close to a mobile switching centre 132 as possible because this allows speech to be transmitted between the transcoder 122 and the base station controller 102 in a cellular radio network form, which saves transmission capacity. In the UMTS system the base station controller 102 can be referred to as RNC (Radio Network Controller).

The transcoder 122 converts different digital speech coding modes used between a public switched telephone network and a radio network, to make them compatible with each other, for instance from the 64 kbit/s fixed network form to another cellular radio network form (such as 13 kbit/s), and vice versa. The control unit 124 carries out call control, mobility management, collection of statistical data and signalling.

As shown in FIG. 1, a circuit-switched connection can be established from the subscriber terminal 150 via the mobile switching centre 132 to a telephone 136 connected to a PSTN (Public Switched Telephone Network) 134. A packet-switched connection, such as GSM phase 2+ packet transmission, i.e. GPRS (General Packet Radio Service), can also be used in a cellular radio network.

The structure of the subscriber terminal 150 can be described utilizing the description of the structure of the transceiver 114 in FIG. 2. The structural parts of the subscriber terminal 150 are operationally the same as those of the transceiver 114. The subscriber terminal 150 additionally comprises: a duplex filter between the antenna 112 and the receiver 200 and between the antenna 112 and the transmitter 220, interface parts and a speech codec. The speech codec is connected to a channel codec 216 via a bus 240.

Figure 4:
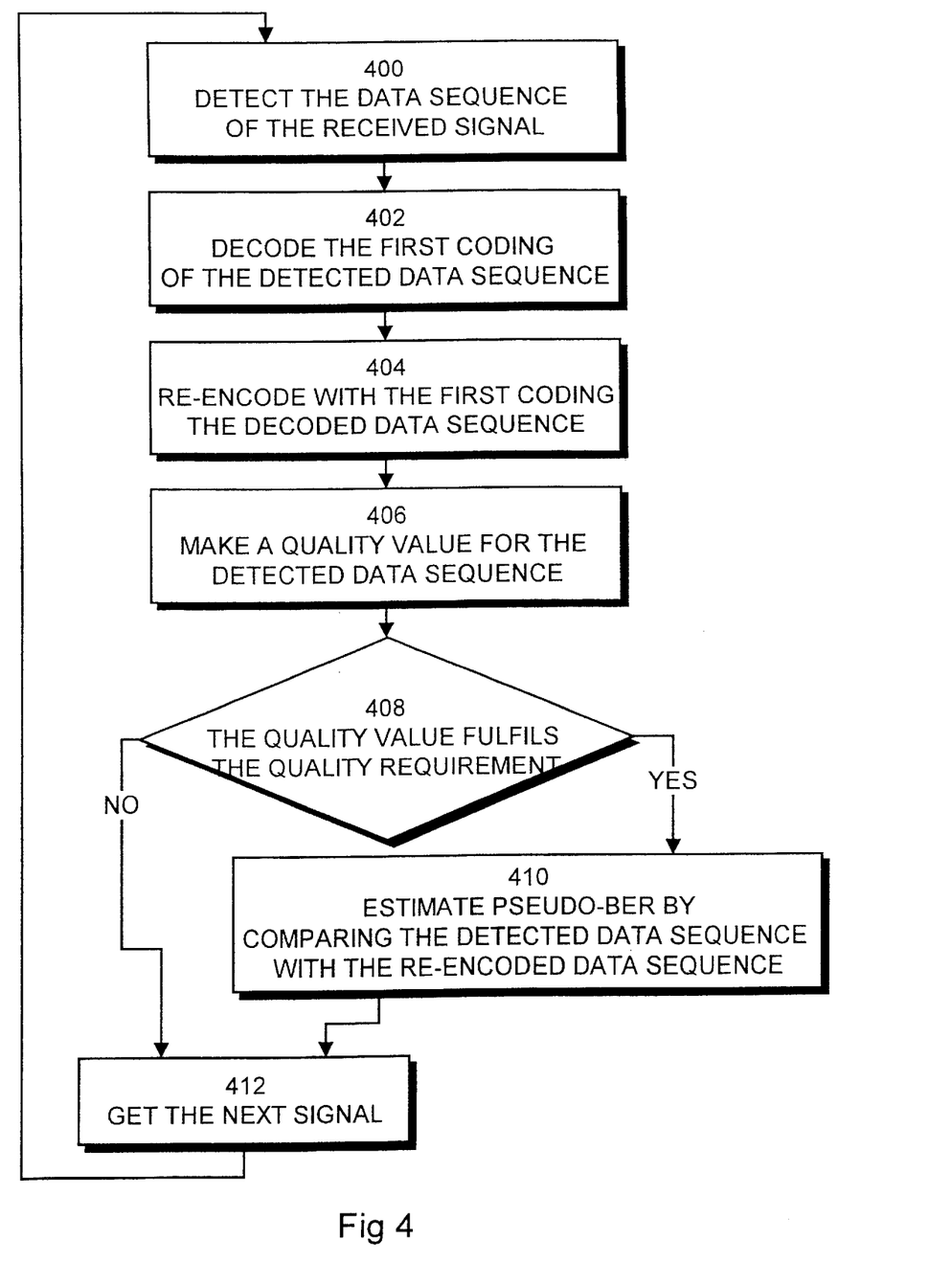
FIG. 4 is a flow diagram illustrating a method of the invention.

With reference to FIG. 4, the operation of the method of the invention will be described. The receiver receives a signal and, as shown in block 400, a data sequence is detected from the received signal. The first encoding of the detected data sequence is then decoded as shown in block 402. In block 404 the data sequence decoded from the first encoding is re-encoded by using the first encoding. In block 406 a value indicating the quality of the detected data sequence is determined. In testing block 408 it is checked whether the value of the detected data sequence fulfils a predetermined quality requirement. If the value of the detected data sequence fulfils the quality requirement, channel bit error ratio is estimated in block 410 by comparing the detected data sequence with the data sequence re-encoded with the first encoding. The routine then proceeds to block 412 to process the next signal received by the receiver and starts again from block 400 to determine the pseudo bit error ratio for the new signal. If the quality requirement of the testing block 408 was not fulfilled, a pseudo error ratio is not determined for the signal processed. Instead, the routine proceeds to block 412 and starts to process the next signal received by the receiver.

Figure 5:
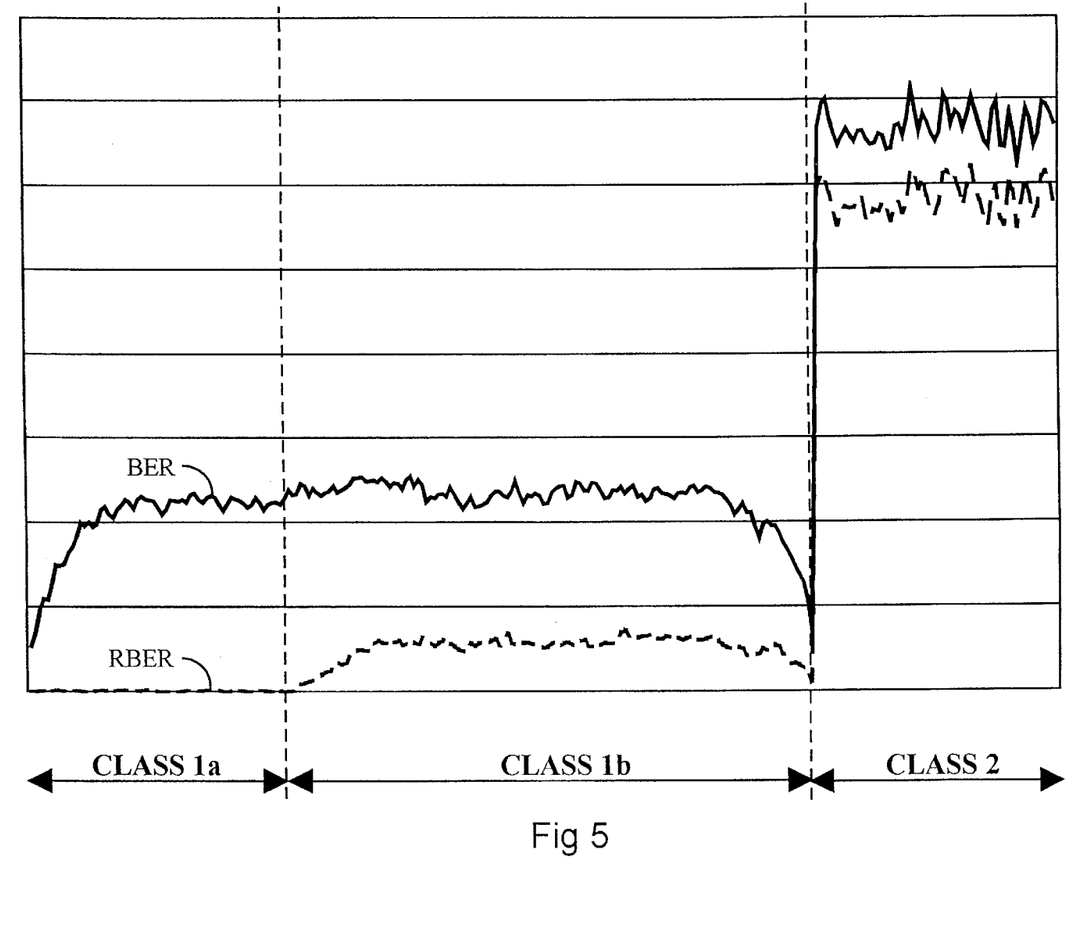
FIG. 5 illustrates bit error ratios in different bit classes.

In cellular radio networks the bits of a coded speech are usually divided into three different classes according to their relative importance. The division is made because all bits do not need to be equally well protected against errors occurring in a channel and, on the other hand, channel capacity does not allow efficient protection of all bits. FIG. 5 shows coded speech bits divided into three protection classes on x axis: class 1a bits are protected by using two different coding methods, class 1b bits are protected with one coding, and class 2 bits are left unprotected. The y axis illustrates the magnitude of the bit error ratio. A continuous curve illustrates the bit error ratios appearing in different protection classes. A curve drawn with a broken line shows a bit error ratio that has only been calculated for frames that are confirmed error-free by means of decoding, for example, or another suitable method. This bit error ratio is referred to as a residual bit error ratio. The curves in FIG. 5 represent actual conditions in a GSM system where bits generated by means of an enhanced full-rate speech codec are transferred on a full-rate channel. The pseudo bit error ratio is calculated in a prior art manner by re-encoding the bits of protection classes 1a and 1b. As shown in FIG. 5, the bit error ratio in classes 1a and 1b is fairly high. This causes errors in the channel bit error ratio estimate because, as already stated, the pseudo bit error ratio is calculated assuming that the decoded data sequence no longer contains errors. In FIG. 5 the real bit error ratio of the channel is shown by the protection class 2 because class 2 bits were transmitted unprotected.

In cellular radio networks the first encoding commonly used for protecting class 1a and 1b bits is convolution coding. Examples of other first encoding methods include orthogonal convolution codes, super-orthogonal convolution codes, punctured convolution codes, turbocodes and concatenated codes. Convolution coding can be advantageously decoded by applying a Viterbi decoder.

The second encoding, used for protecting only class 1a bits, is commonly carried out by linear block coding, which includes Hadamard codes and the group of cyclic codes. An example of cyclic codes is cyclic redundancy check. When necessary, additional information on the coding methods in use is available in *Proakis, John G., Digital Communications, Third Edition*, ISBN 0-07-051726-6, chapter 8: Block and convolutional channel codes.

Figure 3:
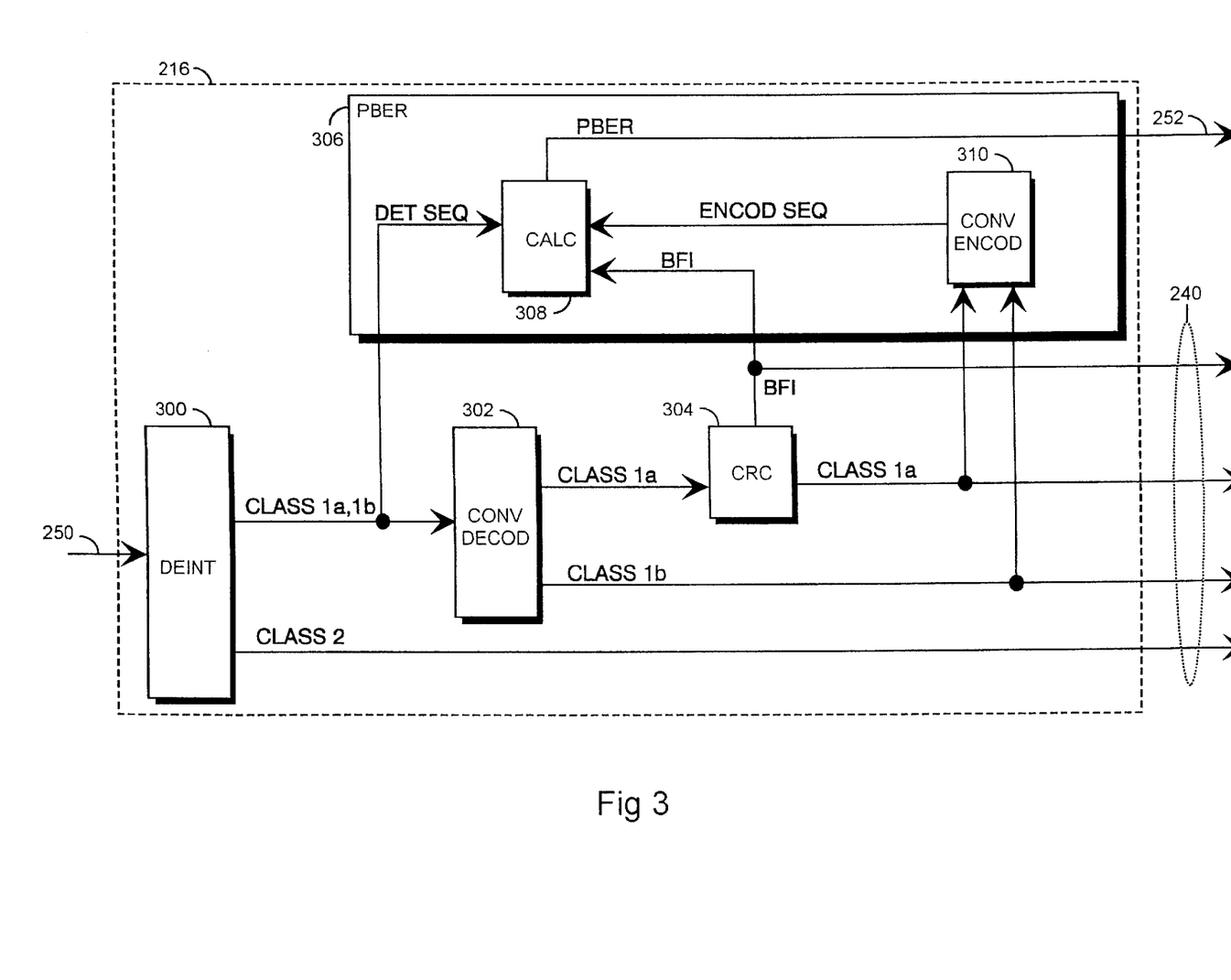
FIG. 3 illustrates an example a channel codec of a receiver.

FIG. 3 illustrates in greater detail the channel codec 216 shown in FIG. 2. The channel codec 216 receives a detected data sequence 250 of the received signal as a bit stream. In block 300 interleaved data sequences, if any, are de-interleaved. In the GSM system, for example, a full-rate speech traffic channel comprises four bursts of data interleaved into eight radio bursts, the data corresponding to 20 ms of speech. After the interleaving is de-interleaved, the bits in the data sequence in question are divided into their respective protection classes 1a, 1b and 2. Class 2 bits are forwarded directly, unprocessed, i.e. in the subscriber terminal 150 they continue on the bus 240 to the speech codec, and at the base station 100 on the bus 240 to the multiplexer 116. Class 1a and 1b bits are supplied to decoding means 302, where they are decoded using preferably a Viterbi decoder, and from there to estimating means 308.

Class 1a bits are then transferred to quality determining means 304 where the second encoding, in this example the cyclic redundancy check, is decoded to allow a value for the quality of the data sequence to be determined, the value indicating the extent of correctness of the class 1a bits received over the radio path. The value for the quality of the data sequence is expressed as a value for the quality of the frame that contains the sequence, the possible values being good frame or bad frame. A data sequence assigned with the value 'bad frame' is sent to the estimating means 308, and a bad frame indication BFI is sent to the bus 240.

The quality of a data sequence can also be determined in other ways. The value indicating the quality of the detected data sequence can be determined, for example: on the basis of the intensity of the signal that contains the data sequence; as a carrier-to-interference ratio of the channel that contains the sequence, as a signal-to-noise ratio of the signal that contains the sequence, or by applying another prior art method available for determining the quality of a channel or a signal. A person skilled in the art is familiar with the determining of the value for quality, therefore it is not described in greater detail in this context.

From the quality determining means 304 class 1a bits are then supplied back to the re-encoding means 310. The class 1a bits supplied to the re-encoding means 310 are the same that were supplied to the quality determining means 304, i.e. they have not been corrected in any way. Class 1b bits are transferred from the decoding means 302 both to the bus 240 and to the re-encoding means 310.

In the re-encoding means class 1a and 1b bits are re-encoded by applying the first encoding used, which in this example is convolution coding.

The re-encoded data sequence is then supplied to the estimating means 308.

The bit error ratio is estimated in the estimating means 308 by comparing class 1a and 1b bits DET SEQ of the detected data sequence with class 1a and 1b bits ENCOD SEQ of the re-encoded data sequence, provided that no bad frame indication BFI is received for the frame concerned. The pseudo bit error means 306 thus provide a pseudo bit error ratio PBER which is transferred on a bus 252 to the control means 214.

The obtained pseudo bit error ratio is preferably informed to the transmitter in the transmitting end. In other words, if the pseudo bit error ratio was calculated for example in the receiver of the subscriber terminal 150, the ratio is informed to the transmitter at the base station 100 in order to allow transmission parameters to be changed, when necessary, to ensure a sufficiently high-quality channel. The described procedure can be advantageously used in association with adaptive multi-rate codecs where the amount of speech coding in relation to the amount of channel coding can be flexibly modified according to the requirements set by channel conditions. In other words, when the pseudo bit error ratio increases, the amount of speech coding can be reduced and the amount of channel coding increased in order to ensure sufficient quality.

The invention is preferably implemented by software, therefore software changes are required, as shown in FIG. 3 for example, in a strictly limited area in the channel codec 216 and control portion 214 of the software in the digital signal processor 232 of the transceiver 114 of the base station 100 and/or the subscriber terminal 150.

In the above described example, the pseudo bit error ratio was calculated by re-encoding class 1a and 1b bits. In a preferred embodiment, the bit error ratio is estimated by using a portion encoded with the second encoding of the data sequence coded with the first encoding as a data sequence. Since the first encoding in the example is convolution coding and the second encoding cyclic redundancy check, the data sequence in question refers to class 1$a$ bits which are coded using both coding methods. In this case the bit error ratio is estimated by using only detected class 1$a$ bits and re-encoded class 1$a$ bits. As shown in FIG. 5, by removing bad frames from class 1$a$ bits, a most reliable result is obtained, because in class 1$b$ bits even good frames usually contain errors, provided that the error protection for classes 1$a$ and 1$b$ is achieved by an equal rate convolution coding.

Figure 6:
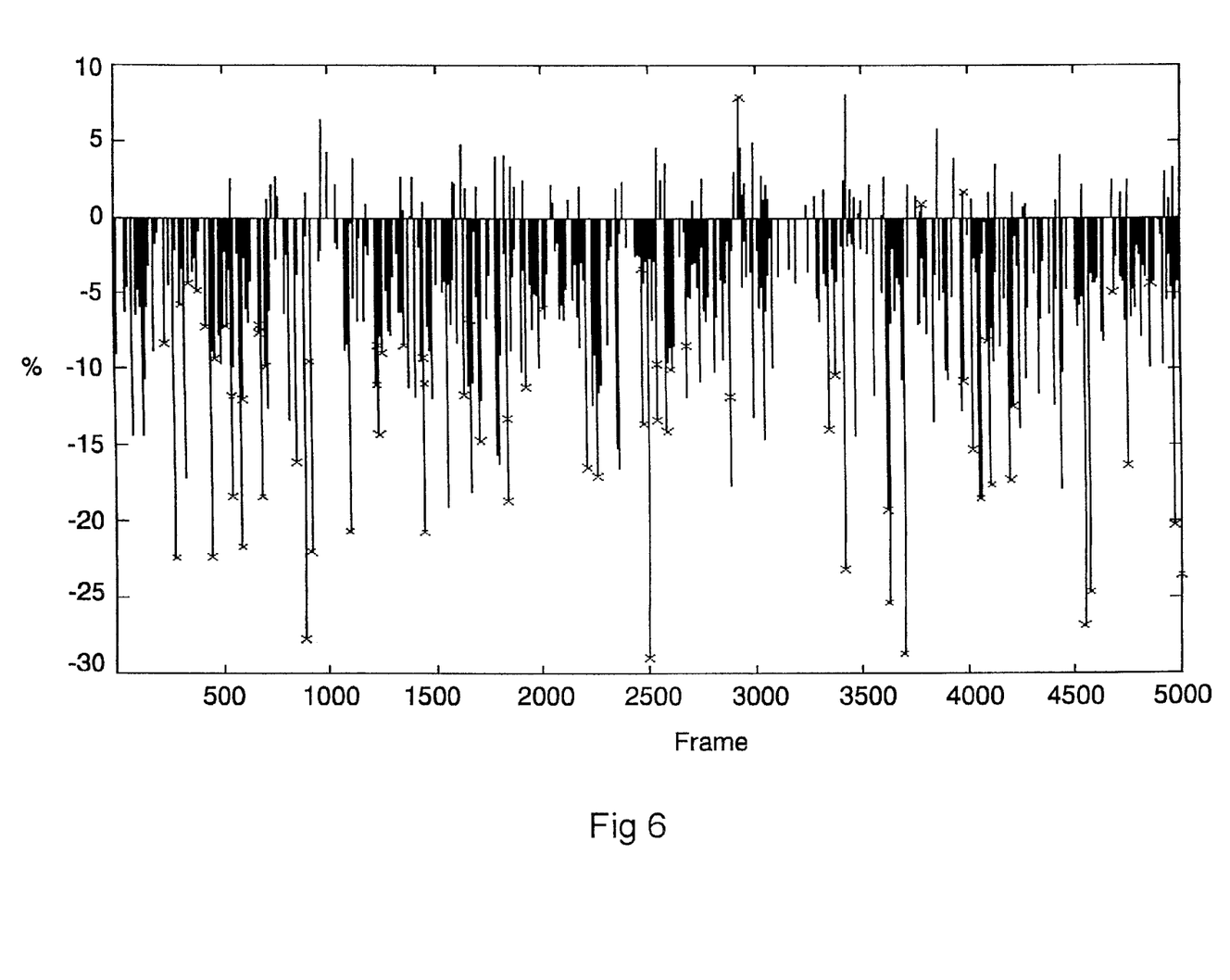
FIG. 6 illustrates a relative error in channel bit error ratio estimation.

FIG. 6 shows the calculation of relative error in channel bit error ratio estimation. The results have been obtained by simulating the Error Pattern 3 EP3 of the ETSI (European Telecommunications Standards Institute) which illustrates a very poor transmission quality, with an average C/I (carrier-to-interference) ratio of 4 dB and bit error ratio of 13%. The simulation involved 5000 frames, which corresponds to about 100 seconds of speech. The relative error percentage $E_i^{relative}$ was calculated by applying the following equation:

$$E_i^{relative} = \begin{cases} 100\dfrac{PBER_i - FBER_i}{FBER_i}, & FBER_i > 0 \\ 0, & FBER_i = 0 \end{cases}$$

where i is the frame index acquiring one of the values 1,2, ..., 5000; $FBER_i$ is the real bit error ratio of the $i^{th}$ frame; and $PBER_i$ is the estimated bit error ratio of the $i^{th}$ frame. In FIG. 6, the frame index is shown on x axis and the relative error percentage on y axis, the error percentage indicating how much the estimated bit error ratio deviates from the real bit error ratio. In FIG. 6, letter X is used for denoting bad frames. As shown in FIG. 6, the highest relative error percentages coincide with bad frames.

Figure 7:
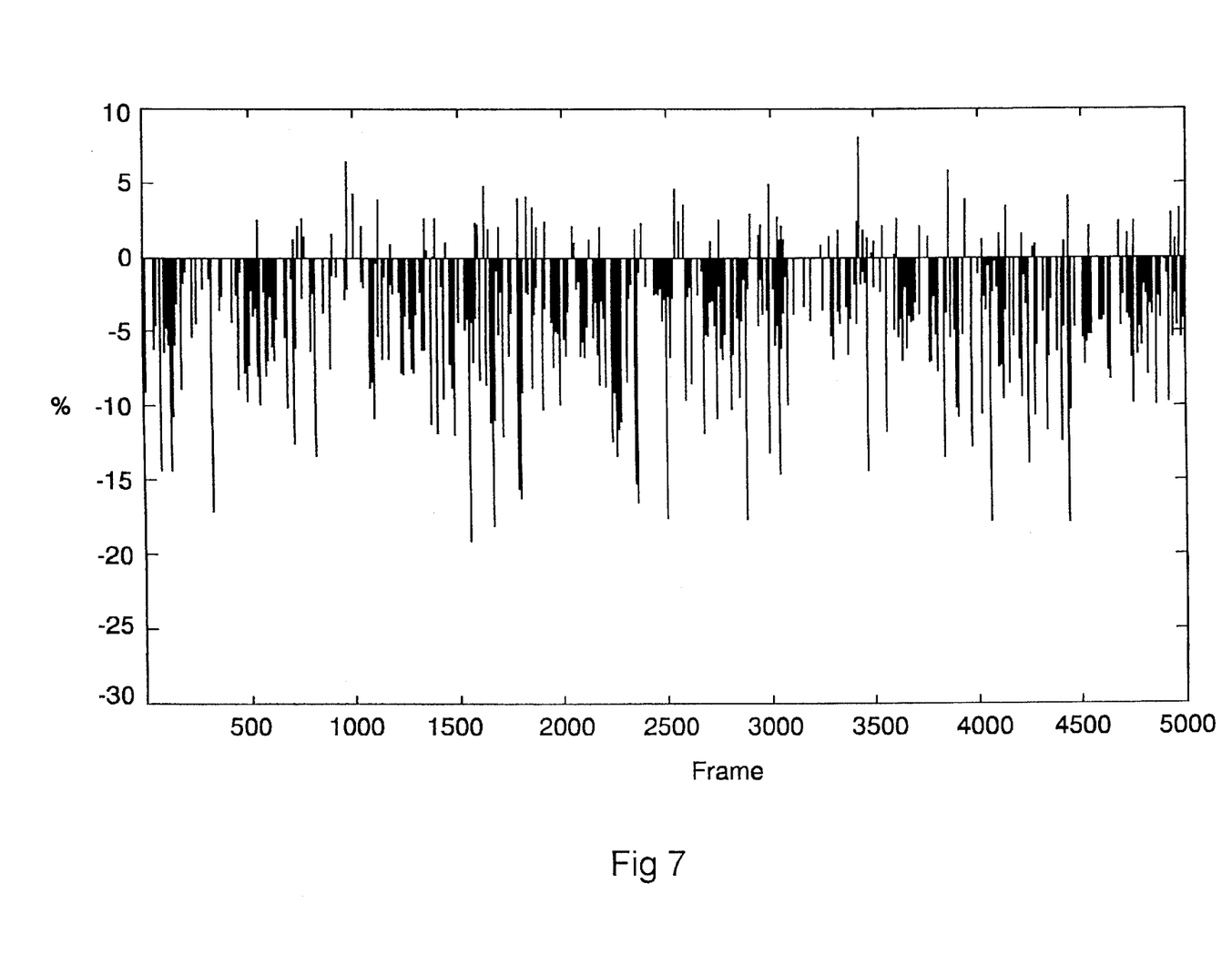
FIG. 7 illustrates how major relative errors that appeared in FIG. 6 are removed when the invention is applied.

FIG. 7 corresponds to FIG. 6, only the bad frames denoted with the letter X in FIG. 6 have been removed by applying the method of the invention. Comparison of FIGS. 6 and 7 confirms the conclusion that when the bit error ratio is only estimated for good frames, the average relative error becomes smaller, which improves the total accuracy of the bit error ratio estimation. FIGS. 6 and 7 show an example of 5000 frames, but in practice the invention is used for calculating the average pseudo bit error ratio of only a few frames, 5 to 20 for example, at a time. Therefore the elimination of even a single frame including a major relative estimation error significantly improves the quality of the average pseudo bit error ratio obtained. Therefore the time window that comprises the frames for which the pseudo bit error ratio is determined can be fairly small. Averaging is achieved, for example, by calculating a median, or by applying some other statistical method, which allows an average pseudo bit error ratio of a window to be established.

If only one frame is determined as a time window, i.e. a separate pseudo error ratio is determined for each frame, a problem arises from how the value for frames the quality of which does not fulfil the predetermined quality requirement is to be determined. According to a preferred embodiment, if the quality of the detected data sequence does not fulfil the predetermined quality requirement, the bit error ratio will be estimated by predicting it on the basis of the pseudo bit error ratios of data sequences received earlier. This predictive method allows for instance the average, or median, to be calculated for the pseudo bit error ratio for a predetermined, longer window, the pseudo bit error ratio thus obtained being then applied to an individual data sequence. Another method available is to use history data to estimate the rate at which the pseudo bit error ratio possibly changes and to thereby predict, on the basis of the previous pseudo bit error ratios, what the likely pseudo bit error ratio should be.

Although the invention is described above with reference to an example shown in the attached drawings, it is apparent that the invention is not restricted to it, but can vary in many ways within the inventive idea disclosed in the attached claims.

What is claimed is:

1. A method for estimating channel bit error ratio in a receiver, the method comprising:
   detecting a data sequence of a received signal encoded by a first encoding scheme;
   decoding the detected data sequence encoded by the first encoding scheme;
   re-encoding the decoded data sequence using the first encoding scheme; and
   determining a quality value for the detected data sequence; and
   estimating a bit error ratio by comparing the detected data sequence with the data sequence re-encoded using the first encoding scheme if the quality value of the detected data sequence fulfils a predetermined quality requirement,
   wherein the quality value of the detected data sequence is determined based on at least one of a carrier-to-interference ratio of the channel that contains the data sequence, and a signal-to-noise ratio of the signal that contains the data sequence.

2. A method according to claim 1, wherein the data sequence is also encoded by a second encoding scheme, and the determining of a quality value includes decoding the detected data sequence that has been decoded using the first encoding scheme with the second encoding scheme.

3. A method according to claim 2 wherein the bit error ratio is estimated using a portion encoded with the second encoding scheme of the data sequence.

4. A method according to claim 1, wherein the first encoding scheme is a convolution coding.

5. A method according to claim 4, wherein the convolution coding is decoded using a Viterbi decoder.

6. A method according to claim 2, wherein the second encoding scheme is a linear block coding.

7. A method according to claim 6, wherein the linear block coding is a cyclic coding.

8. A method according to claim 7, wherein the cyclic coding is a cyclic redundancy check.

9. A method according to claim 1, wherein the data sequence comprises class 1$a$ and 1$b$ bits.

10. A method according to claim 2, wherein the data sequence comprises class 1$a$ bits.

11. A method according to claim 2, wherein the quality value of the data sequence is expressed as a value for the quality of a frame that contains the data sequence.

12. A method according to claim 11, wherein the value for frame quality is one of a good frame and a bad frame, the good frame fulfilling the predetermined quality requirement, and the bad frame does not fulfill the predetermined quality requirement.

13. A method according to claim 1, wherein if the quality value of the detected data sequence does not fulfill the predetermined quality requirement, the bit error ratio is estimated using pseudo bit error ratios of previously received data sequences.

14. A receiver, comprising:
   a mechanism configured to detect a data sequence of a received signal encoded by a first encoding scheme;

a mechanism configured to decode the detected data sequence encoded by the first encoding scheme, the mechanism configured to decode being coupled to the mechanism configured to detect the data sequence;

a mechanism configured to re-encode the decoded data sequence using the first encoding scheme, the mechanism configured to re-encode being arranged to receive the decoded data sequence from said mechanism configured to decode;

a mechanism configured to determine a value for the quality of the detected data sequence encoded by the first encoding scheme; and a mechanism configured to estimate a bit error ratio by comparing the detected data sequence with the data sequence re-encoded using the first encoding scheme if the quality of the detected data sequence fulfills a predetermined quality requirement, wherein the mechanism configured to determine a value for quality is arranged to determine the quality value of the detected data sequence based on at least one of a carrier-to-interference ratio of the channel and a signal-to-noise ratio of the signal.

15. A receiver according to claim 14, further comprising a mechanism configured to encode the data sequence using a second encoding scheme, wherein the mechanism configured to determine a value for quality determines the quality of the detected data sequence by decoding the data sequence that has been decoded using the first encoding scheme.

16. A receiver according to claim 15, wherein the mechanism configured to estimate the bit error ratio uses a portion encoded with the second encoding scheme of the data sequence.

17. A receiver according to claim 14, wherein the first encoding scheme is a convolution coding.

18. A receiver according to claim 14, wherein the mechanism configured to decode comprises a Viterbi decoder.

19. A receiver according to claim 15, wherein the second encoding scheme is a linear block coding.

20. A receiver according to claim 19, wherein the linear block coding is a cyclic coding.

21. A receiver according to claim 20, wherein the cyclic coding is a cyclic redundancy check.

22. A receiver according to claim 14, wherein the data sequence comprises class 1*a* and 1*b* bits.

23. A receiver according to claim 15, wherein the data sequence comprises class 1*a* bits.

24. A receiver according to claim 15, wherein the mechanism configured to determine a value for quality is arranged to express the value for the quality of the data sequence as a value for the quality of a frame that contains the data sequence.

25. A receiver according to claim 24, wherein the value for the quality of said frame is one of a good frame and a bad frame, wherein said mechanism configured to estimate the bit error ratio is arranged to operate using the good frame when the predetermined quality requirement is fulfilled, and the bad frame when the predetermined quality requirement is not fulfilled.

26. A receiver according to claim 14, wherein if the value for the quality of the detected data sequence does not fulfill the predetermined quality requirement, the mechanism configured to estimate the bit error ratio is arranged to estimate the bit error ratio by applying pseudo bit error ratios of previously received data sequences.

* * * * *